US008920246B2

(12) United States Patent
Grundstedt et al.

(10) Patent No.: US 8,920,246 B2
(45) Date of Patent: Dec. 30, 2014

(54) GAMING MACHINE USER INTERFACES

(75) Inventors: Cole Grundstedt, Las Vegas, NV (US); Robert Linley Muir, Lane Cove (AU)

(73) Assignee: Aristocrat Technologies Australia Pty Limited, Australia (AU)

( * ) Notice: Subject to any disclaimer, the term of this patent is extended or adjusted under 35 U.S.C. 154(b) by 1210 days.

(21) Appl. No.: 11/563,477

(22) Filed: Nov. 27, 2006

(65) Prior Publication Data

US 2007/0155511 A1 Jul. 5, 2007

Related U.S. Application Data

(63) Continuation-in-part of application No. PCT/AU2005/000936, filed on Jun. 27, 2005.

(30) Foreign Application Priority Data

Jun. 25, 2004 (AU) ................................ 2004903481

(51) Int. Cl.
*A63F 13/08* (2006.01)
*G07F 17/32* (2006.01)

(52) U.S. Cl.
CPC ............ *G07F 17/32* (2013.01); *G07F 17/3216* (2013.01)
USPC ............................................................ 463/46

(58) Field of Classification Search
USPC .......................................... 463/36, 37, 46, 47
See application file for complete search history.

(56) References Cited

U.S. PATENT DOCUMENTS 5,342,047 A * 8/1994 Heidel et al. .................... 463/29
5,435,557 A 7/1995 Coffee
6,079,709 A 6/2000 Ethridge et al.
6,454,649 B1 * 9/2002 Mattice et al. .................. 463/17
2002/0173354 A1 * 11/2002 Winans et al. .................. 463/20
2003/0027629 A1 * 2/2003 Pimienta ......................... 463/25
2003/0236114 A1 12/2003 Griswold et al.
2004/0018877 A1 * 1/2004 Tastad et al. ..................... 463/46
2005/0059458 A1 * 3/2005 Griswold et al. ............... 463/16

FOREIGN PATENT DOCUMENTS

EP 931574 A1 7/1999
WO 2004025546 A1 3/2004
WO 2005034055 A1 4/2005

OTHER PUBLICATIONS

International Search Report, Application No. PCT/AU2005/000936, Australian Patent Office, Aug. 17, 2005.

* cited by examiner

*Primary Examiner* — Damon Pierce
*Assistant Examiner* — Allen Chan
(74) *Attorney, Agent, or Firm* — McAndrews, Held & Malloy, Ltd.

(57) ABSTRACT

A device such as a gaming console comprises a display screen and a game controller arranged to allow a player to play a game and awarding a prize or feature if a winning combination results. A mechanical display filter is configured to visually distinguish at least two portions of the display screen from one another. The mechanical display screen may have buttons, including buttons which actuate a touch screen. The display screen can be used to illuminate portions of the mechanical display screen to produce visual effects, including using complex lighting patterns. The display screen may be used to illuminate buttons forming part of a user interface, or a separate screen may be used to illuminate the buttons from behind the buttons.

21 Claims, 13 Drawing Sheets

GAMING MACHINE USER INTERFACES

This is a continuation-in-part of international patent application number PCT/AU2005/000936, with an international filing date of 27 Jun. 2005, which claims priority from Australian patent application number 2004903481, with a filing date of 25 Jun. 2004. The PCT application is herein incorporated by reference in its entirety.

FIELD OF THE INVENTION

In one embodiment, the invention relates to user interfaces for computational devices. This embodiment may have particular application to user interfaces for computational devices used for entertainment and may have even more particular application to gaming consoles of the type known as slot machines or gaming machines. A particular embodiment of the present invention relates to user interfaces for such gaming consoles.

In another embodiment, the present invention relates to gaming consoles of the type known as slot machines arranged to play a large variety of card related and other gambling games such as keno or bingo. A particular embodiment of the invention relates to a display used on such a machine.

BACKGROUND OF THE INVENTION

Most computational devices have a user interface that includes a keyboard, keypad or touch screen interface, which allows a user of the device to enter information that may be subsequently acted on by the computational device. The form of the user interface depends on the function of the computational device. One form of computational device is a gaming machine or poker machine.

Gaming or poker machines have been well known for many years and have more recently gained considerable popularity, with quite substantial amounts of money wagered on these machines. There is a growing tendency for governments to legalise the use of gaming machines and consoles by licensing operators, with resulting revenue gains through licence fees and taxation of money invested.

With the growth that has occurred in the gaming machine market there is intense competition between manufacturers to supply the various existing and new venues. Gaming machine manufacturers are keen to devise games and gaming consoles which are visually pleasing to, and readily understood and usable by, players. Further, with the passage of time players can become bored or dissatisfied with the appearance and functionality of existing machines. To prevent this, it is desirable to provide either new machines with a new appearance and functionality or means for reconfiguring existing machines to have a new appearance and functionality.

Current gaming consoles typically use one or more displays, generally either LCD or CRT, although other technologies such as electroluminescent displays have also been used. Suitable design and use of such displays can make a console more visually pleasing to a user, both from a distance and while using the console.

Gaming machine manufacturers such as Silicon Gaming and Ainsworth Gaming Technology have used large displays oriented in a portrait mode. A potential problem with these displays is that the player of the machine can be confused as to where to look. In machines where there are two mechanically distinguished displays, a primary display and a secondary display, it is very easy for the player to understand how the game is played across the two displays.

As large displays become lower in cost it becomes feasible and in some cases preferable to use a single display instead of multiple displays.

Touch screens are used on gaming console displays to enable the user to interact with the display. In some cases a button will exist both as a physical button for the player to depress, as well as a touchable virtual button on the display itself. In the case of a physical button for the player to depress, screen marking and degradation associated with touch screens is reduced.

SUMMARY OF THE INVENTION

According to a first aspect the present invention provides a gaming console comprising a display means, such as a display screen, and game control means, such as a game controller, arranged to control images displayed on the display means, the game control means being arranged to enable a user to play a game displayed on the display means and, if one of a plurality of winning combinations result, a prize or feature is awarded or paid, the console further comprising a mechanical display filter configured to visually distinguish at least a first portion of the display means from a second portion of the display means.

The display means may have two or more portions, distinguished from one another by the mechanical display filter.

According to a second aspect the present invention provides a gaming system comprising at least one display means, such as a display screen, and at least one game control means, such as a game controller, arranged to control images displayed on the display means, the game control means being arranged to play a respective game displayed on each display means and, if one of a plurality of winning combinations result, the gaming system pays or awards a prize or feature, the gaming system being characterised in that at least one of said display means has associated therewith a mechanical display filter configured to visually distinguish at least a first portion of that display means from a second portion of that display means.

In one embodiment, the game control means, or part thereof, may be remote from the display screen and may form part of a central controller connected to a plurality of gaming consoles.

In embodiments of the second aspect of the present invention each of a plurality of display means may have associated therewith a respective mechanical display filter. Each such mechanical display filter may adopt one or more of the features set out herein. The plurality of display means may be controlled so as to implement independent games, such that a game played by a first user on a first display means is unrelated to a second game played by a second user on a second display means. Additionally or alternatively, the plurality of display means may be controlled so as to implement one or more interconnected games, such that events in a first game played on a first display means may influence the events of a second game played on a second display means, for example in the manner set out in Australian Patent Application No. 2003200343, the contents of which are incorporated herein by reference.

A single display screen may have a plurality of mechanical display filters, each provided for a respective portion of the display screen, and the gaming system may include a plurality of input devices, one associated with each said portion of the display screen. The gaming system may be arranged to provide separately playable games for each said portion of the display screen.

According to a third aspect the present invention provides a display assembly for a gaming console, the display assembly comprising:

a display means, such as a display screen, for displaying images under the control of a game control means, such as a game controller; and a mechanical display filter configured to visually distinguish at least a first portion of the display means from a second portion of the display means.

In embodiments of the first, second or third aspects of the present invention, at least the first portion of the display means, for example, a first portion and second portion of the display means, may comprise an unobscured portion of the display means. In further embodiments, the mechanical display filter may comprise at least a first transparent portion covering and defining the first portion of the display means. Alternatively the mechanical display filter may comprise at least a first aperture situated over and defining the first portion of the display means. Similarly, the mechanical display filter may comprise a second transparent portion, or further transparent portions, covering and defining the second or further portions of the display means. Alternatively the mechanical display filter may comprise a second aperture, or further apertures, situated over and defining the second portion or further portions of the display means. In such or other embodiments, the mechanical display filter preferably comprises an opaque or translucent portion situated between at least a first portion and a second portion of the display means, in order to obscure a portion of the display means between the at least a first portion and second portion of the display means such that the mechanical display filter assists in clearly visually distinguishing the at least a first portion of the display means from a second portion of the display means.

Additionally or alternatively, in embodiments of the first, second or third aspects of the invention, at least one of the portions of the display means may be partially obscured by the mechanical display filter. Such embodiments may provide, for example, for a gaming console in which a first portion of the display means is visible to a user of the gaming console, for example to display pertinent features of the game to be played, while a second portion of the display means is partially obscured by a translucent portion of the mechanical display filter, for example to present pleasing illumination to the user. Such illumination can advantageously be provided by such embodiments of the invention in addition to displaying pertinent features of the game, while enabling use of a single display means in the gaming console for providing both such functions.

In preferred embodiments of the first, second or third aspects of the present invention, the mechanical display filter is a layer, such as an overlay, of a size substantially equal to or larger than the display means. Such a mechanical display filter layer may be formed integrally with the display means, or alternatively may be mounted so as to cover the display means.

In alternate embodiments of the first, second or third aspects of the present invention, the mechanical display filter may comprise a divider, such as a longitudinal member, configured to extend partially or entirely across the display means, thus visually distinguishing portions of the display means on either side of the divider or longitudinal member. Such a divider is preferably of a width to adequately visually distinguish at least a first portion of the display means from a second portion of the display means. In embodiments where the divider is opaque, the width of the divider is preferably minimised in order to enable a majority of the display means to be used in displaying images or providing illumination to a user.

In further embodiments of the first, second or third aspects of the present invention, the mechanical display filter is preferably removably mounted over the display means, to enable the mechanical display filter to be replaced, improved and/or repaired. In such embodiments the removable mounting is preferably configured to only allow authorised removal of the mechanical display filter, for example, by inclusion of locking means to prevent unauthorised removal.

In embodiments of the first, second or third aspects of the present invention, at least a first portion of the display means may be substantially rectangular, or any other shape. The at least a first portion and a second portion may be the same shape or may take different shapes from one another. The at least a first portion and a second portion may be of substantially the same size, or may adopt different sizes from one another.

In preferred embodiments of the first, second or third aspects of the present invention, the mechanical display filter may have at least two portions with different light transmittal properties. For example, the mechanical display filter may comprise portions of varying color, pattern, transparency, translucency, or opacity, such that at least two portions of the mechanical display filter is distinguished from one another. In a further example, the mechanical display filter may comprise colored or patterned, transparent and/or translucent portions such that illumination from the portion of the display means behind the transparent and/or translucent portions causes a pleasing visual effect to a user of the console. The visual effect may thus be altered by appropriate illumination from that portion of the display means. In such embodiments, the mechanical display filter may further comprise light tubes configured to transport light from a portion of the display means to illuminate such transparent or translucent portions. Additionally or alternatively, at least one mirror may be positioned to transport light from a portion of the display means to illuminate such transparent or translucent portions. In a further embodiment, the mechanical display filter has at least one screen configured to prevent the transportation of light thereby preventing at least one portion of the display means from illuminating at least one portion of the mechanical display filter.

In yet further embodiments of the first, second or third aspects of the present invention, the mechanical display filter may further comprise one or more buttons for user actuation in controlling an aspect of a game displayed on the display means. The one or more buttons may be illuminated by a portion of the display means over which the mechanical display filter is mounted. The one or more buttons may be mounted directly over such portions of the display means. Additionally or alternatively, the buttons may be mounted at a distance from such portions of the display means, the mechanical display filter further comprising light tubes to transport light from such portions of the display means to the position of the buttons. Such embodiments enable the mechanical display filter to visually alter or increase the display area presented by the display means to a user of the console. Such embodiments may further be particularly advantageous in allowing buttons of the mechanical display filter to be illuminated in a complex manner by appropriate control of the respective portions of the display means. Such complex lighting has not been possible or has been expensive and difficult to implement previously with traditional mechanical buttons and dedicated lighting arrangements for each button.

In further embodiments of the first, second or third aspects of the invention, the mechanical display filter may comprise light tubes configured to transport light from a portion of the display means to illuminate artwork of the mechanical display filter.

In embodiments of the first, second or third aspects of the present invention in which the mechanical display filter comprises buttons, and in which the display means comprises a touch screen, the mechanical display filter may further comprise means to transfer an actuation force applied to each button to the display means so as to actuate a portion of the touch screen associated with that button. Such embodiments are advantageous in providing display assembly manufacturers or gaming console manufacturers with the ability to implement only touch screen functionality in the display assembly, while retaining the option of adding traditional push buttons to the mechanical display filter as required. Further, the means to transfer the actuation force is preferably designed to apply only sufficient force to the touch screen as is required to actuate the touch screen. Such embodiments may prolong the lifetime of the touch screen by avoiding application of excessive user force to the touch screen.

In further embodiments of the first, second or third aspects of the present invention, the mechanical display filter may further comprise a card reader, such as a magnetic card reader.

In still further embodiments of the first, second or third aspects of the invention, the mechanical display filter may comprise one or more position sensors. The one or more position sensors may be optical sensors. Such embodiments allow accurate alignment of the mechanical display filter relative to at least a portion of an image displayed on the display means or the display means to ensure that areas of the display means are filtered correctly in accordance with the intention of the mechanical display filter. Additionally or alternatively, the mechanical display filter may comprise one or more calibration buttons to actuate a touch screen, such that calibration of the position of the filter may be determined with reference to a portion of the touch screen engaged by the one or more calibration buttons. Such calibration buttons may be dedicated for calibration purposes or may additionally serve as game control buttons. Such calibration may be performed at installation of the mechanical display filter. Additionally or alternatively, calibration of the position of the mechanical display filter relative to the at least a portion of an image displayed on the display means or the display means may be performed during game play on the console, for example in an ongoing dynamic manner.

In some embodiments of the first, second or third aspects of the present invention, the mechanical display filter may comprise identification means, such as a filter identifier, enabling electronic verification that the mechanical display filter is appropriate for a game or games to be displayed on the display means. For example the identification means may enable a game control means to determine whether the mechanical display filter comprises a correct number of buttons for play of the game or games to be displayed on the display means. Additionally or alternatively, the identification means may enable a game control means to appropriately configure at least a first and second portions of the display means to physically align at least one portion of an image displayed on said display means with the mechanical display filter.

In further embodiments of the first, second or third aspects of the present invention, the mechanical screen filter may be movably mounted over the display means, in a manner that allows a user to select a position of the mechanical screen filter relative to the display means. For example the mechanical display filter may be mounted such that a user is able to move the mechanical display filter, to define a size of a first portion of the display means relative to a second portion of the display means, within bounds. Such embodiments enable a game control means to sense a current position of the mechanical display filter, and to alter the output of the display means to conform to the current proportions of the first portion of the display means and the second portion of the display means, as defined by a current position of the mechanical display filter. In further such embodiments, in response to a current position of the mechanical display filter; the game control means may be configured to alter one or more of the following factors of a game being displayed:

a number of displayed gaming symbols;

a number of possible winning outcomes;

a prize value associated with one or more winning outcomes; and/or the probability of each gaming outcome.

According to a fourth aspect the present invention provides a mechanical screen filter for a display means, such as a display screen, of a gaming console, the mechanical display filter being configured to visually distinguish at least a first portion of the display means from a second portion of the display means. The mechanical display filter may be configured to visually distinguish two of more portions from one another by the mechanical display filter.

In some embodiments of the fourth aspect of the present invention, the mechanical display filter may comprise at least a first transparent portion for covering and defining a first portion of the display means. Alternatively the mechanical display filter may comprise at least a first aperture for situating over and defining a first portion of the display means. Similarly, the mechanical display filter may comprise a second transparent portion, or further transparent portions, for covering and defining the second or further portions of the display means. Alternatively the mechanical display filter may comprise a second aperture, or further apertures, for situating over and defining the second or further portions of the display means. In such or other embodiments, the mechanical display filter preferably comprises an opaque or translucent portion configured to be situated between at least a first portion and a second portion of the display means, for obscuring a portion of the display means between the at least a first portion and second portion of the display means such that the mechanical display filter assists in clearly visually distinguishing the at least a first portion of the display means from a second portion of the display means.

Additionally or alternatively, in some embodiments of the fourth aspect of the invention, the mechanical display filter may be configured to partially obscure at least one of the portions of the display means. Such embodiments, for example, may provide a mechanical display filter which, in use, allows a first portion of the display means to be visible to a user, for example to display pertinent features of the game to be played, while partially obscuring a second portion of the display means by a translucent portion of the mechanical display filter, for example to present pleasing illumination to the user. Such illumination can advantageously be provided by such embodiments of the invention in addition to displaying pertinent features of the game, while enabling use of a single display means in the gaming console for providing both such functions.

In alternate embodiments of the fourth aspect of the present invention, the mechanical display filter may comprise a divider, such as a longitudinal member, configured to extend partially or entirely across the display means, thus visually distinguishing portions of the display means on either side of the divider. Such a divider is preferably of a width to, in use, adequately visually distinguish at least a first portion of the display means from a second portion of the display means. In embodiments where the divider is opaque, the width of the divider is preferably minimised in order to, in use, enable a majority of the display means to be used in displaying images to a user.

In further embodiments of the fourth aspect of the present invention, the mechanical display filter is preferably adapted to be removably mounted over a display means, to enable the mechanical display filter to be replaced, improved and/or repaired. In such embodiments the removable mounting is preferably configured to only allow authorised removal of the mechanical display filter, for example, by inclusion of locking means to prevent unauthorised removal.

In still further embodiments of the fourth aspect of the present invention, the mechanical display filter may have at least two portions with different light transmittal properties. For example, the mechanical display filter may comprise portions of varying color, pattern, transparency, translucency and/or opacity. In a further example, the mechanical display filter may comprise colored or patterned, transparent and/or translucent portions, such that illumination from behind the transparent and/or translucent portions causes a pleasing visual effect to a user. The visual effect may thus be altered by appropriate illumination.

In yet further embodiments of the fourth aspect of the present invention, the mechanical display filter may further comprise one or more buttons for user actuation. The one or more buttons may be illuminated from a rear side of the mechanical display filter. The mechanical display filter may further comprise light tubes to transport light to the position of the buttons. Such embodiments enable the mechanical display filter, in use, to visually alter or increase the display area presented by the display means to a user. Such embodiments may further be particularly advantageous in allowing buttons of the console to be illuminated in a complex manner by appropriate control of illumination applied to the rear side of the mechanical display filter.

In further embodiments of the fourth aspect of the invention, the mechanical display filter may comprise light tubes configured to transport light to illuminate artwork of the mechanical display filter.

In embodiments of the fourth aspect of the present invention in which the mechanical display filter comprises buttons, the mechanical display filter may further comprise means to transfer an actuation force applied to each button to a touch screen so as to actuate a portion of the touch screen associated with that button. Further, the means to transfer the actuation force is preferably designed to apply only sufficient force to the touch screen as is required to actuate the touch screen. Such embodiments may prolong the lifetime of the touch screen by avoiding application of excessive user force to the touch screen.

In further embodiments of the fourth aspect of the present invention, the mechanical display filter may further comprise a card reader, such as a magnetic card reader.

In still further embodiments of the fourth aspect of the invention, the mechanical display filter may comprise one or more position sensors. The one or more position sensors may be optical sensors. Such embodiments allow accurate alignment of the mechanical display filter relative to at least a portion of an image displayed on a display means or a display means to ensure that areas of the display means are filtered correctly in accordance with the intention of the mechanical display filter.

In some embodiments of the fourth aspect of the present invention, the mechanical display filter may comprise identification means enabling electronic verification that the mechanical display filter is appropriate for a game or games to be displayed on the display means. For example the identification means may enable a game control means to determine whether the mechanical display filter comprises a correct number of buttons for play of the game or games to be displayed on the display means. Additionally or alternatively, the identification means may enable a game control means to appropriately configure at least a first and second portion of the display means to physically align at least one portion of an image displayed on said display means with the mechanical display filter.

In further embodiments of the fourth aspect of the present invention, the mechanical screen filter may be adapted for movable mounting over the display means, so as to allow a user to select a position of the mechanical screen filter relative to the display means.

According to a fifth aspect the present invention provides a method for constructing a display assembly of a gaming console for displaying images under the control of a game control means, such as a game controller, the method comprising:

providing a display means, such as a display screen; and providing a mechanical display filter such that the mechanical display filter visually distinguishes at least a first portion of the display means from a second portion of the display means.

The mechanical display filter may visually distinguish two or more portions of the display means from one another.

Preferred embodiments of the fifth aspect of the invention further comprise mounting the mechanical display filter to the display means so as to cover the display means. In such embodiments, the method of the fifth aspect of the present invention preferably further comprises providing position sensors for sensing a position of the mechanical display filter relative to the display means or at least a portion of an image displayed on the display means. The position sensors may be provided on the mechanical display filter or on the display means. In such embodiments the method of the fifth aspect of the present invention preferably further comprises:

sequentially illuminating each portion of the display means; and recording a portion of the display means which is illuminated at a time when the optical sensor senses illumination.

The portions of the display means sequentially illuminated may comprise pixels of the display means, or other sized portions of the display means.

In alternate embodiments of the fifth aspect of the present invention, the method further comprises calibrating the position of the optical sensor relative to at least a portion of an image displayed on the display means by:

illuminating substantially half of the display means;

recording a response from the optical sensor;

determining a sub-portion of the display adjacent to which the optical sensor is positioned; and repeating the steps of illuminating, recording, and determining in respect of the sub-portion of the display means.

Such a method provides a logarithmic speed approach to the precise position of the optical sensor rather than the linear speed approach of a sequential illumination of pixels. Such steps may be carried out until it has been determined that the sub-portion of the display means adjacent to which the optical sensor is positioned is of a sufficiently small size for calibration purposes. For example the sub-portion may be required to comprise one pixel.

In preferred embodiments of the fifth aspect of the invention, providing the mechanical display filter comprises mounting the mechanical display filter to the display means. In a further embodiment, providing the mechanical display filter may comprise removably mounting the mechanical display filter to the display means. In this or other embodiments, the method may include locking the mechanical display filter to the display means to prevent unauthorised removal. Preferably, such removable mounting enables only authorised removal of the mechanical display filter.

In other embodiments of the fifth aspect of the present invention, providing the mechanical display filter may comprise forming the mechanical display filter integrally with the display means. For example, the mechanical display filter may be painted on to the display means.

In further embodiments of the fifth aspect of the present invention, the method may comprise:

providing buttons on the mechanical display filter.

Such embodiments of the fifth aspect of the present invention may further comprise providing light tubes to convey light from a portion of the display means to illuminate the buttons.

In yet further embodiments of the fifth aspect of the present invention, the method may comprise providing the mechanical display filter with identification means enabling electronic verification that the mechanical display filter is appropriate for a game or games to be displayed on the display means. For example the identification means may enable the game control means to determine whether the mechanical display filter comprises a correct number of buttons for play of the game or games to be displayed on the display means. Additionally or alternatively, the identification means may enable the game control means to appropriately configure at least a first and second portion of the display means to physically align at least one portion of an image displayed on the display means with the mechanical display filter.

In further embodiments of the fifth aspect of the present invention, the method may comprise movably mounting the mechanical screen filter over the display means, in a manner that allows a user to select a position of the mechanical screen filter relative to the display means. For example the mechanical display filter may be movably mounted such that a user of the display assembly is able to move the mechanical display filter, to define a size of a first portion of the display means relative to a second portion of the display means, within bounds.

Embodiments of the first to fifth aspects of the present invention provide the user interface advantages of presenting a plurality of display regions, along with the advantages of installing only a single display means.

According to a sixth aspect the present invention provides a user interface comprising a communication interface for connection to a computational controller, a bank of buttons comprising a plurality of buttons and a button housing, circuitry connected to the communication interface and arranged to detect or allow detection by the computational controller of the pressing of a button in the bank of buttons, and a display screen connected to the communication interface and controllable by control signals received at the communication interface, the display screen being located behind the bank of buttons and at least one of at least two said buttons and the button housing being constructed so that material displayed by the display screen are viewable there through.

The communication interface may comprise a first connection and a second connection, the first connection communicating information indicative of pressing of a button in the bank of buttons and the second connection communicating control information to the display screen.

The bank of buttons may comprise at least a portion that is constructed from a transparent or translucent material through which the display screen is viewable. At least one said button may be transparent and the button housing is translucent or opaque. The button may comprise a translucent or transparent top surface and opaque or substantially opaque side walls extending from the top surface. The button may have one of an open base or a closed based formed by a transparent or translucent material.

The display screen may extend below every one of the buttons in the bank of buttons.

The circuitry may comprise a column-row matrix of conductors and the buttons are switches that connect a column and row in the matrix when depressed. The buttons may be transparent to allow the display screen to viewed there through and the circuitry may be arranged about the buttons so as to not impede viewing of the display screen through the buttons.

The user interface may further comprise at least one optical component to modify the image displayed on the display screen as viewed through the button or button housing.

The display may be a LCD display.

According to a seventh aspect the present invention provides an apparatus for performing computational tasks in response to inputs received from a user interface, the apparatus comprising a display screen, and a bank of buttons communicably connected to an electronic processing system, the electronic processing system being in communication with memory storing program code and operable to execute the program code, wherein the display screen is controlled by the electronic processing system, is located behind the bank of buttons, and is viewable through the bank of buttons at a plurality of separate locations.

The display screen may be controlled by the electronic processing system to display information indicating a function of at least two buttons in the bank of buttons.

The display screen may extend substantially across the area occupied by at least two buttons in the bank of buttons and is controlled by the electronic processing system to display information indicating a function of each said button.

The bank of buttons may comprise a button and a button housing and wherein the display screen is viewable through at least one button and the button housing is one of translucent and opaque. The bank of buttons may comprise a plurality of buttons and a button housing, the display screen being viewable through each of the plurality of buttons.

The computational apparatus may comprise at least one optical component to modify the image displayed on the display screen as viewed through the bank of buttons.

The program code may comprise a plurality of separate programs, each program when executed by the electronic processing system causing the electronic processing system to control the second display to display different material that is viewable through the bank of buttons.

The program code may comprise at least one program that has at least a two states in which different material is displayed on the second display.

According to an eighth aspect the present invention provides an apparatus for performing computational tasks in response to inputs received from a user interface, the apparatus comprising a computational controller, a user interface comprising a bank of buttons and circuitry arranged so that the computational controller detects the pressing of a button in the bank of buttons, and a display screen located behind the bank of buttons and controlled by the computational controller, the computational controller operating in at least two modes of operation to control the display screen to display material indicating the function of at least one button in the bank of buttons, the material differing for each said mode of operation, the bank of buttons being constructed so that the material displayed by the display screen is viewable there through.

The modes of operation may comprise two different states of the computational device during execution of program code.

The modes of operation may comprise execution of two different programs.

According to a ninth aspect the present invention provides a gaming machine comprising a first display and a bank of buttons in communication with a game controller, the gaming machine providing a game in which symbols are displayed on the first display in accordance with a random selection process and evaluated for a winning outcome, play of the game being controlled by the game controller at least partly in response to inputs received from the bank of buttons, the gaming machine further comprising a second display controllable by an electronic processing system through a communications interface, wherein the second display is located behind the bank of buttons, and the bank of buttons is arranged so that the second display can be viewed through the bank of buttons.

The electronic processing system may be the game controller and the communications interface may comprise a connection to the game controller. Alternatively, the electronic processing system may be distinct from the game controller. The electronic processing system may then be located physically remote of the game controller and gaming machine.

The gaming machine may be operable to provide any of a plurality of games, wherein the electronic processing system causes the second display to display different material depending on which one of the plurality of games the gaming machine is providing at that time.

The gaming machine may be operable in an attract mode, wherein the electronic processing system causes the second display to display different material when the gaming machine is in the attract mode from when the gaming machine is providing the game.

The bank of buttons may comprise a plurality of buttons and a button housing and wherein at least one of the buttons is made from a transparent material to allow the second display to be viewed there through and the button housing is either opaque or translucent.

At least one of the buttons may have a top surface that is transparent and a side surface extending from the top surface that is opaque or substantially opaque.

The gaming machine may further comprise at least one optical component to modify the image displayed on the second display screen as viewed through the bank of buttons.

According to a tenth aspect the present invention provides a method of manufacturing a gaming console, the method comprising providing a first display and a bank of buttons having at least two translucent or transparent portions, providing the display and the bank of buttons with first and second communication ports respectively to allow communication with a game controller, locating a second display behind the bank of buttons so as to be viewable through the translucent or transparent portions of the bank of buttons, and providing the second display with a third communication port to allow communication with an electronic processing system.

The method may further comprise providing a game controller and connecting the game controller to the first and second communication ports.

The electronic processing system may be the game controller and the method may further comprise connecting the game controller to the third communication port. Alternatively, the electronic processing system may be distinct from and remote to the game controller and the method may further comprise connecting the electronic processing system to the third communication port.

Further aspects of the present invention will become apparent from the following description, given by way of example and with reference to the accompanying drawings.

BRIEF DESCRIPTION OF THE DRAWINGS

Non-limiting examples of the invention will now be described with reference to the accompanying drawings in which.

DETAILED DESCRIPTION OF THE EMBODIMENTS

In the following detailed description the methodology of the embodiments will be described with reference to gaming consoles and gaming machines, and it is to be understood that it is within the capabilities of the non-inventive worker in the art to introduce the methodology on any standard microprocessor-based gaming machine or on gaming machines including other types of game controllers by means of appropriate programming.

Figure 1:
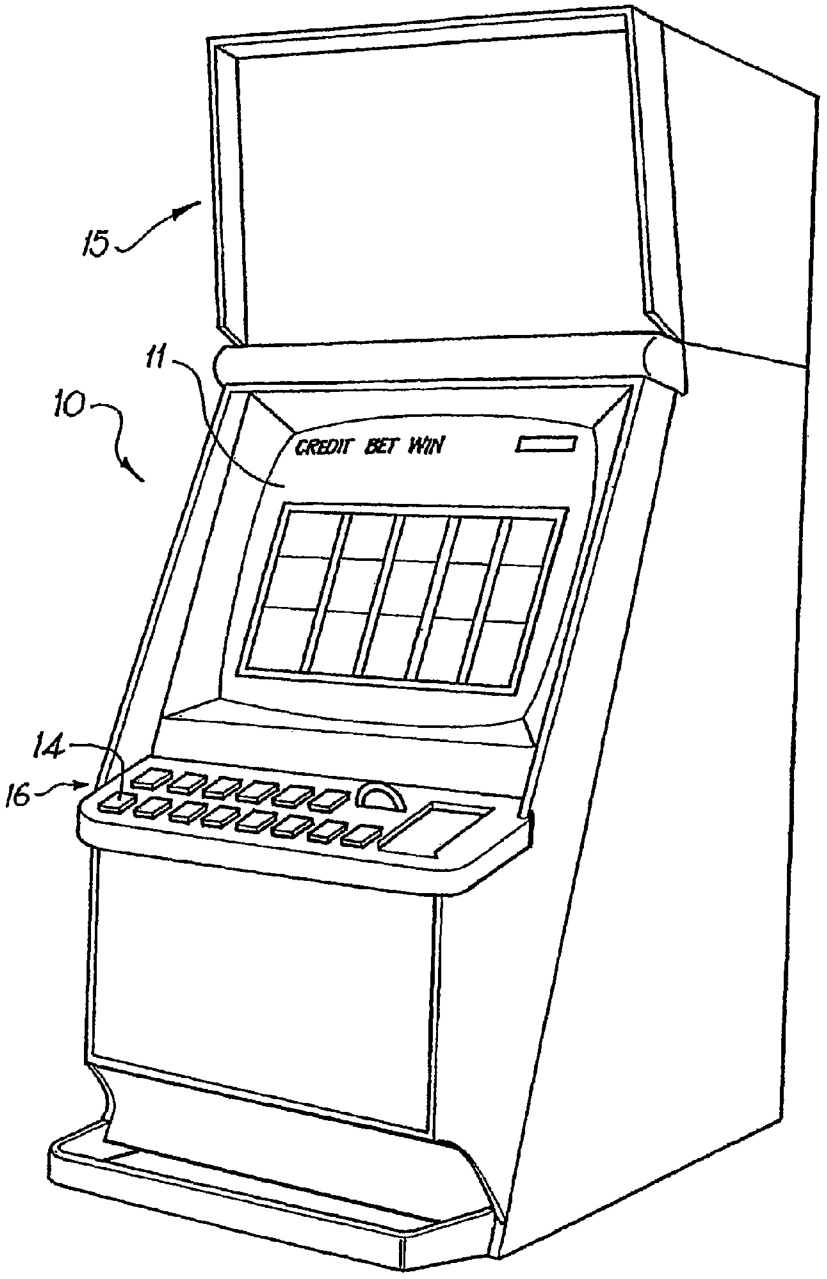
FIG. 1 illustrates a conventional gaming console.

Referring to FIG. 1 of the drawings, a conventional slot machine 10 is illustrated, of the type having a video display screen 11, which displays a game, in this instance including a plurality of rotatable reels carrying symbols, and is arranged to pay a prize on the occurrence of a predetermined symbol or combination of symbols.

In the slot machine 10 illustrated in FIG. 1, the game is initiated by a push button 14 in a bank of buttons 16, however, it will be recognised by persons skilled in the art that this operating mechanism might be replaced by a pull handle, touch screen, or other type of actuator in other embodiments of the invention. The top box 15 on top of the slot machine 10 carries an artwork panel or player marketing module (PMM) which displays the various winning combinations for which a prize is paid on this machine. The PMM on the slot machine 10 may additionally comprise a small video display (such as LCD), buttons and a magnetic card reader.

Figure 2:
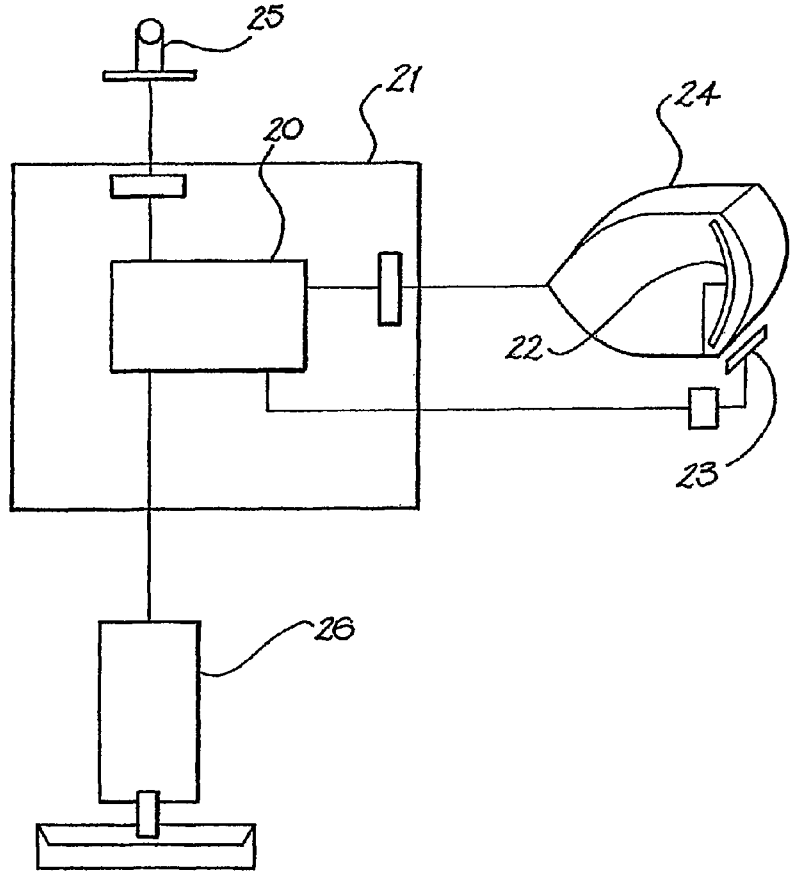
FIG. 2 is a schematic diagram of a conventional gaming console control circuit.

The program which implements the game and game feature is run on a standard gaming machine control processor or other suitable computational device 20 as illustrated schematically in FIG. 2. The computational device 20 forms part of a controller 21 which drives the video display screen 22 of the console 24 and receives input signals from sensors 23. The sensors 23 may be touch sensors, a pull handle or another type of actuator in other embodiments of the invention. The controller 21 also receives input pulses from a mechanism 25 indicating the user has provided sufficient credit to begin playing. The mechanism 25 may be a coin input chute, a credit card reader, or other type of validation device. The controller 21 further rives a payout mechanism 26 which for example may be a coin output.

In another embodiment, a remote controller may be provided in the form of a central controller linked to a plurality of gaming machines or consoles. The outcome of the games may be determined centrally and communicated to individual machines or consoles, which primarily have an interface function for displaying the outcome of a particular game, including a player interface for enabling player interaction.

Figure 3:
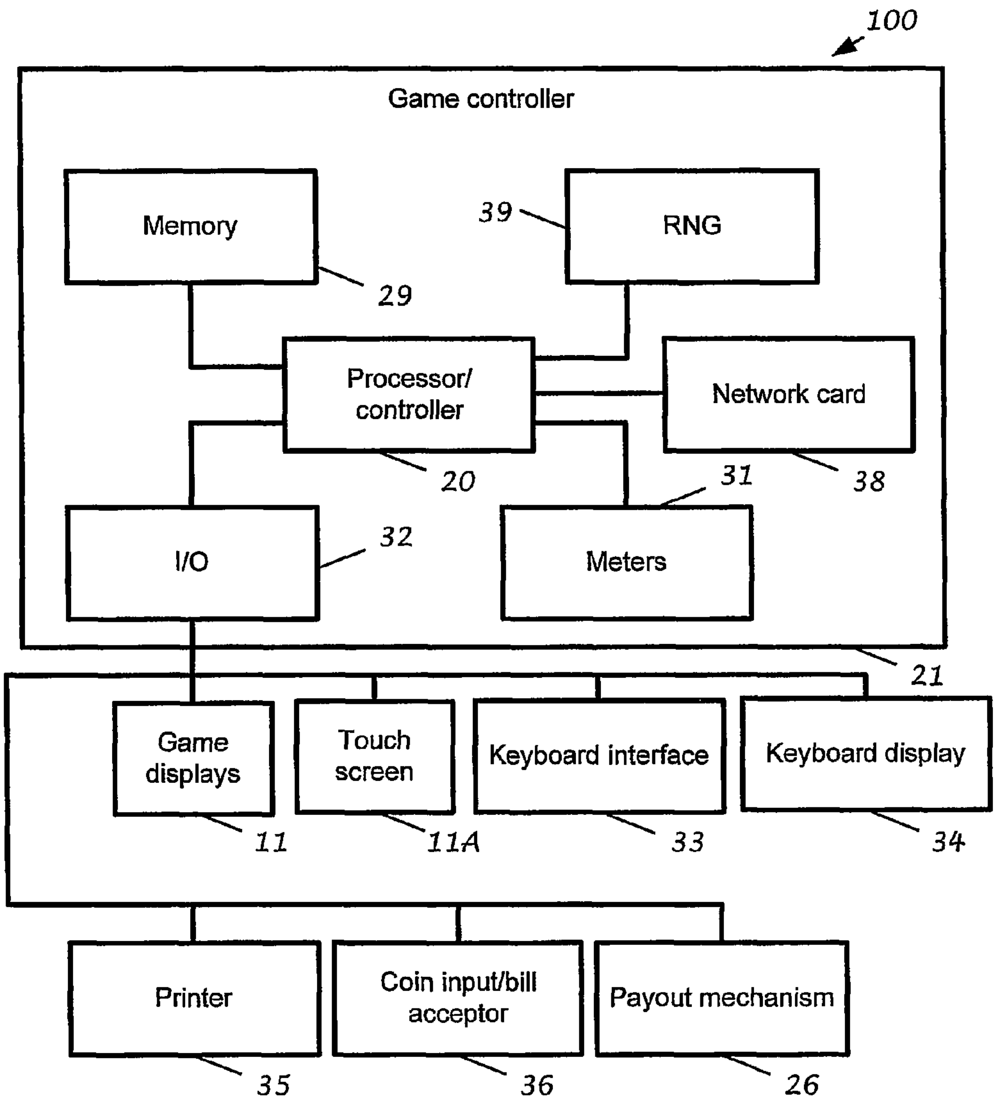
FIG. 3 shows a block diagram of a gaming machine.

FIG. 3 shows a block diagram of an embodiment of a gaming device, generally referenced by arrow 100. The gaming device 100 may, for example, operate as a standalone slot machine of the type shown in FIG. 1. However, the gaming device 100 may alternatively operate as a networked gaming machine, communicating with other network devices, such as one or more servers or other gaming machines. The gaming device 100 may also have distributed hardware and software components that communicate with each other directly or through a network.

As explained in relation to FIG. 2, the gaming device 100 includes a controller 21, which is shown in more detail in FIG. 3. In the illustrated example the controller 21 includes a computational device 20, which may be a microprocessor, microcontroller, programmable logic device or other suitable device. Instructions and data to control operation of the computational device 20 are stored in a memory 29, which is in data communication with, or forms a part of, the computational device 20. Typically, the gaming device 100 will include both volatile and non-volatile memory and more than one of each type of memory, with such memories being collectively represented by the memory 29. The instructions to cause the controller 21 to provide a game on the slot machine 10 will be stored in the memory 29.

The gaming apparatus may include hardware meters 31 for the purposes of regulatory compliance and also include an input/output (I/O) interface 32 for communicating with the peripheral devices of the gaming device 100. The input/output interface 32 and/or the peripheral devices may be intelligent devices with their own memory for instructions and data.

In the example shown in FIG. 3, the peripheral devices that communicate with the controller are the video display screen 11, a keyboard interface 33, a button display 34 (see herein below), a printer 35, a bill acceptor and/or coin input mechanism 36 (which may be the mechanism 25) and the payout mechanism 26. The display screen 11 may be provided with a touch screen 11A. Additional devices may be included as part of the gaming device 100, or devices omitted as required for the specific implementation.

In addition, the gaming device 100 may include a communications interface, for example a network card 38. The network card 38, may for example, send status information, accounting information or other information to a central controller, server or database and receive data or commands from a central controller, server or database. One or more of the peripheral devices, for example the button display 34 may be able to communicate directly with the network card 38.

The game controller 101 may also include a random number generator (RNG) 39, which generates a series of random numbers that determine the outcome of a series of random game events played as part of a game on the gaming device 100.

Figure 4:
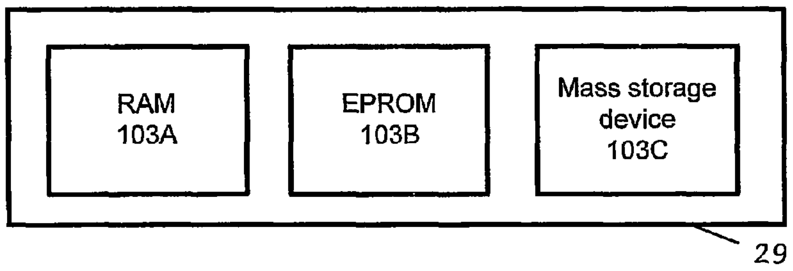
FIG. 4 shows a block diagram of components of the memory of the gaming machine represented in FIG. 3.

FIG. 4 shows an exemplary block diagram of the main components of the memory 29. The RAM 103A typically temporarily holds program files for execution by the computational controller 102 and related data. The EPROM 103B may be a boot ROM device and/or may contain some system or game related code. The mass storage device 103C may be used to store game programs, the integrity of which may be verified and/or authenticated by the computational controller 102 using protected code from the EPROM 103B or elsewhere.

Figure 5:
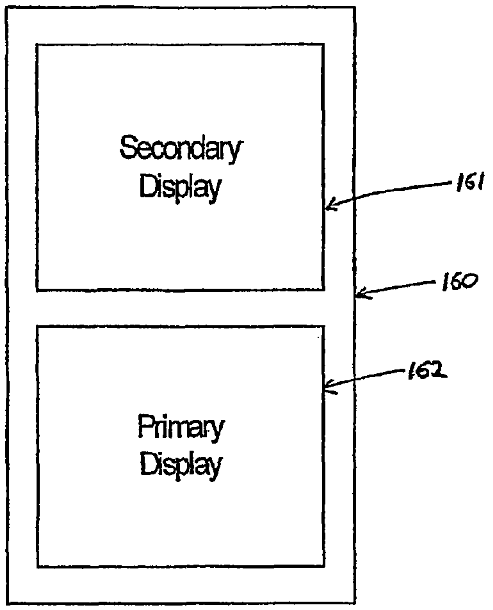
FIG. 5 illustrates a plurality of display regions of a gaming console in accordance with a related art solution.

FIG. 5 illustrates a plurality of display regions 161, 162 of a gaming console 160 in accordance with a related art solution. Whilst the provision of multiple display regions 161, 162 enables presentation of a primary display 162 and a secondary display 161, such prior art solutions necessitate the installation of two separate video displays.

Figure 6:
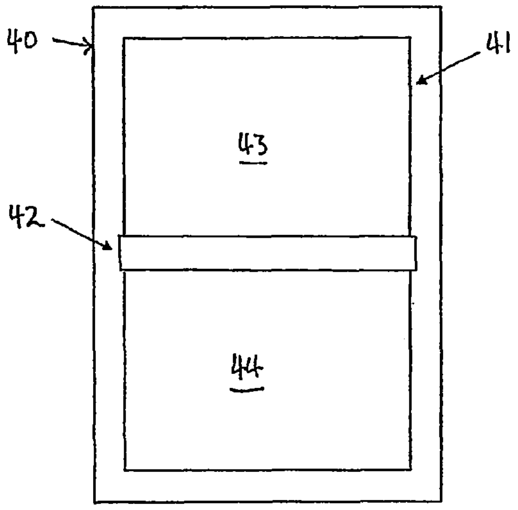
FIG. 6 illustrates a front view of a video display and mechanical screen filter in accordance with a first embodiment of the present invention.

FIG. 6 illustrates a video display 41 and mechanical screen filter 42 of a gaming console 40 in accordance with a first embodiment of the present invention. The single large display 41 is mechanically screened/filtered by filter 42 so as to appear to be two smaller displays 43, 44. The large display 41 may be a cathode ray tube (CRT), liquid crystal display (LCD), plasma, electroluminescent, or other type of display. The smaller displays 43, 44 may be used to represent any combination of primary, secondary, and PMM displays as desired. Preferably the mechanical display filter 42 is opaque, blocking light from the display from being seen by the player, and may comprise one or more of a metal, opaque glass or plastic sheet, or paint. The mechanical display filter 42 may additionally or alternately be in some areas partially transparent and/or translucent, allowing it to have the appearance of a non-display area, yet with software controllable color and/or illumination, by way of backlighting from the display 41.

The mechanical screen filter 42 may equally be applied to any display screen linked to a game or jackpot display controller to visually distinguish at least two portions of the display screen from one another.

The filter 42 may be further customised in shape, giving display regions 43, 44 the appearance of a non-rectangular display. The mechanical filter 42 may further be used to mount further hardware, such as buttons and magnetic card readers.

Figure 7:
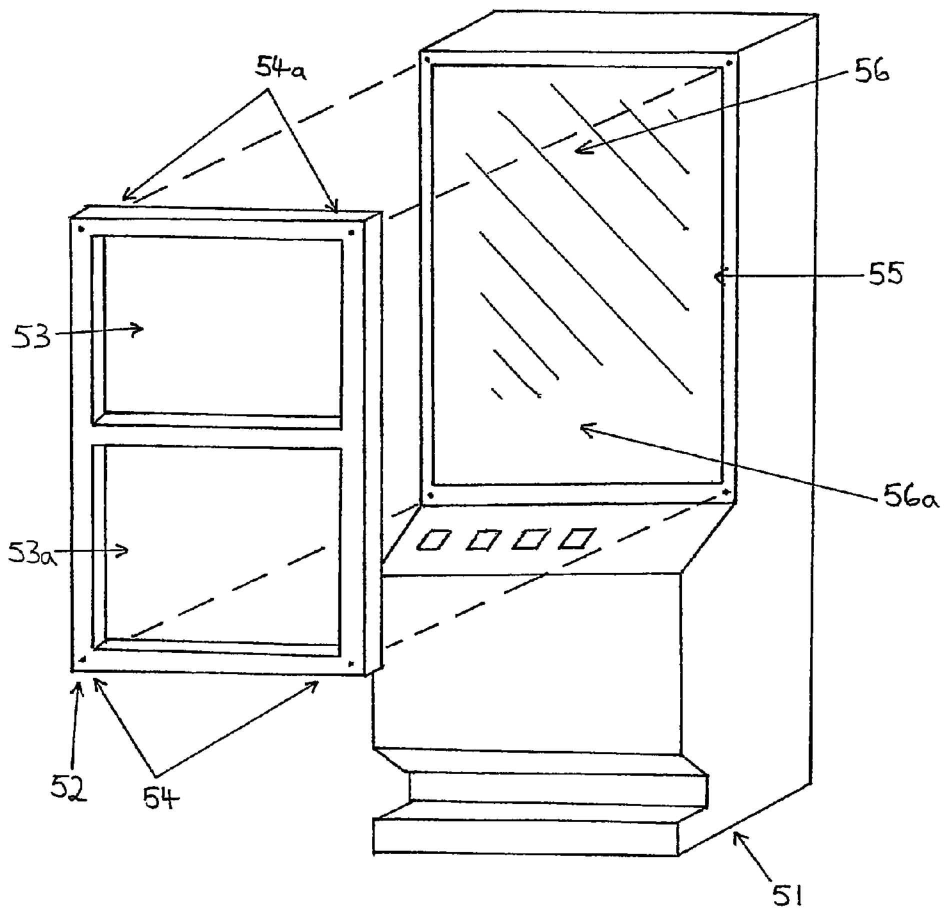
FIG. 7 illustrates an exploded perspective view of a gaming console and mechanical screen filter in accordance with the first embodiment.

FIG. 7 illustrates a second embodiment of the present invention. In this embodiment, the mechanical display filter 52 comprises a frame which defines a first aperture 53 and a second aperture 53*a*. The mechanical display filter is shown as removably mountable onto the gaming console 51 over the display screen 55 by use of screw or bolt fasters through the holes 54 and 54*a*. Similar mechanical fasteners or other mounting means may be used. In one embodiment of the present invention, unauthorised removal of the mechanical display filter 52 may be prevented by provision of screw or bolt fasteners with a security head or other locking means. Once mounted on the gaming console 51, the first aperture 53 and the second aperture 53*a* of the mechanical display filter 52 define a first portion of the display screen 55 in the area indicated by 56 and a second portion of the display screen 55 indicated by 56*a* respectively.

Figure 8:
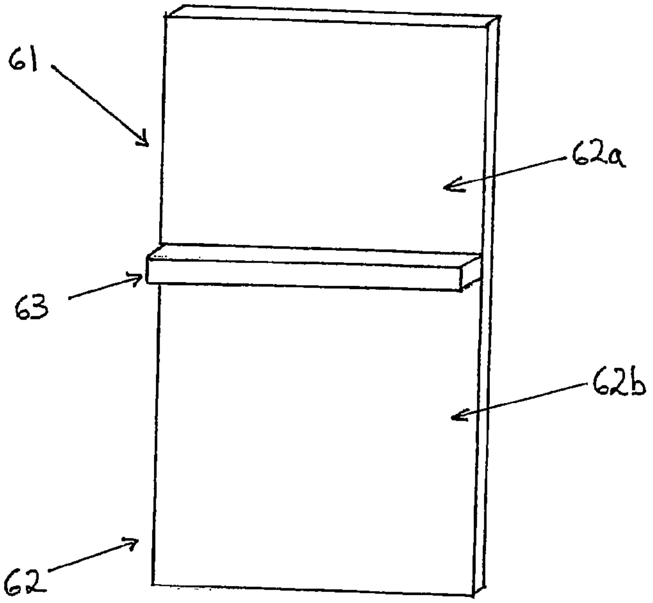
FIG. 8 illustrates a perspective view of a mechanical screen filter in accordance with a second embodiment of the present invention.

Referring to FIG. 8, a third embodiment of the present invention is illustrated. The mechanical display filter 61 comprises a transparent overlay 62 and a divider 63. The transparent overlay 62 may be constructed of glass, plastic or any other suitable material. The divider 63 is preferably translucent or opaque. The mechanical display filter 61 is mounted over a display screen such that the portion of the transparent overlay 62*a* defines a first portion of the display screen and the portion of the transparent overlay 62*b* defines a second portion of the display screen.

Figure 9:
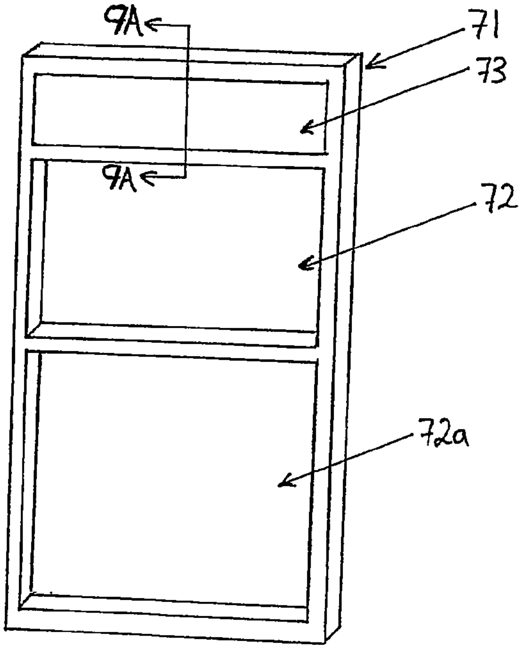
FIG. 9 illustrates a perspective view of a mechanical screen filter in accordance with a third embodiment of the present invention.

FIG. 9 shows a fourth embodiment of the present invention. FIG. 9 shows a mechanical display filter 71 which defines a first aperture 72 and a second aperture 72*a* and a translucent portion 73. The mechanical display filter is preferably mounted on a gaming console over a display screen to visually distinguish a first, second and third portion of a display screen. The first aperture 72 and the second aperture 72*a* are used to define a first portion and a second portion of the display screen respectively. These portions of the display screen are unobscured.

The translucent portion 73 overlays a third portion of the display screen. The third portion is partially obscured by the translucent portion, which is illuminated by the third portion of the display screen to produce different visual effects. For example, the display screen may be illuminated to have the appearance of running lights in one or several different colors, to sequence through a range of different colors and brightness or to have any other complex or simple illumination, illumination pattern or illumination sequence. Each form of illumination will illuminate the translucent portion 73 in different ways and can be used to produce visually pleasing light effects. If translucent artwork were provided on the translucent portion 73, this artwork may be illuminated by the display screen in a visually pleasing manner. Light pipes or mirrors may be used to transport light from the display screen to the translucent portion, as is discussed in greater detail with respect to FIGS. 10 and 11.

Figure 9A:
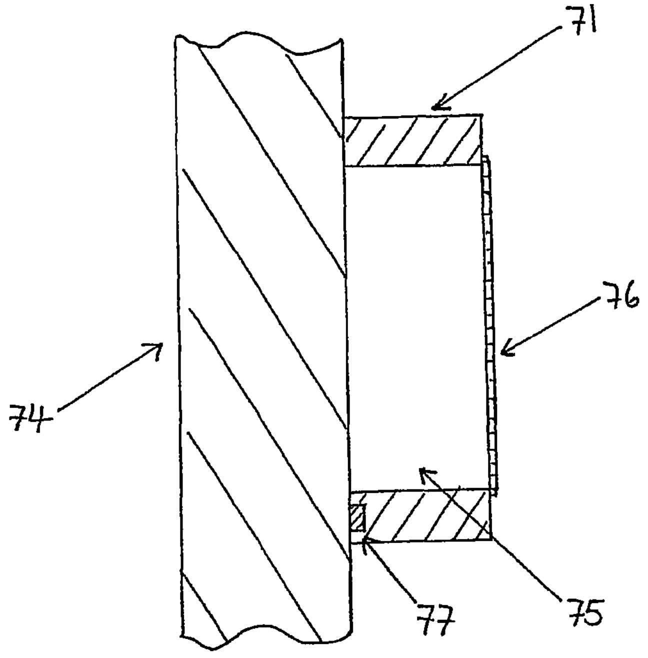
FIG. 9A is a partial cross sectional view along the line 9A-9A of FIG. 9.

FIG. 9A shows a partial cross sectional view through line 9A-9A in FIG. 9, drawn through the centre of the translucent portion 73 of the mechanical display filter 71. The mechanical display filter 71 is shown mounted over a display screen 74. The area 75 allows light to pass from the display screen 74 to illuminate the translucent portion 76. A light tube may be provided in the area 75 to facilitate better transmission of the light. Translucent artwork may be placed on the translucent portion 76 to be illuminated by the light originating from the display screen 74.

Figure 10:
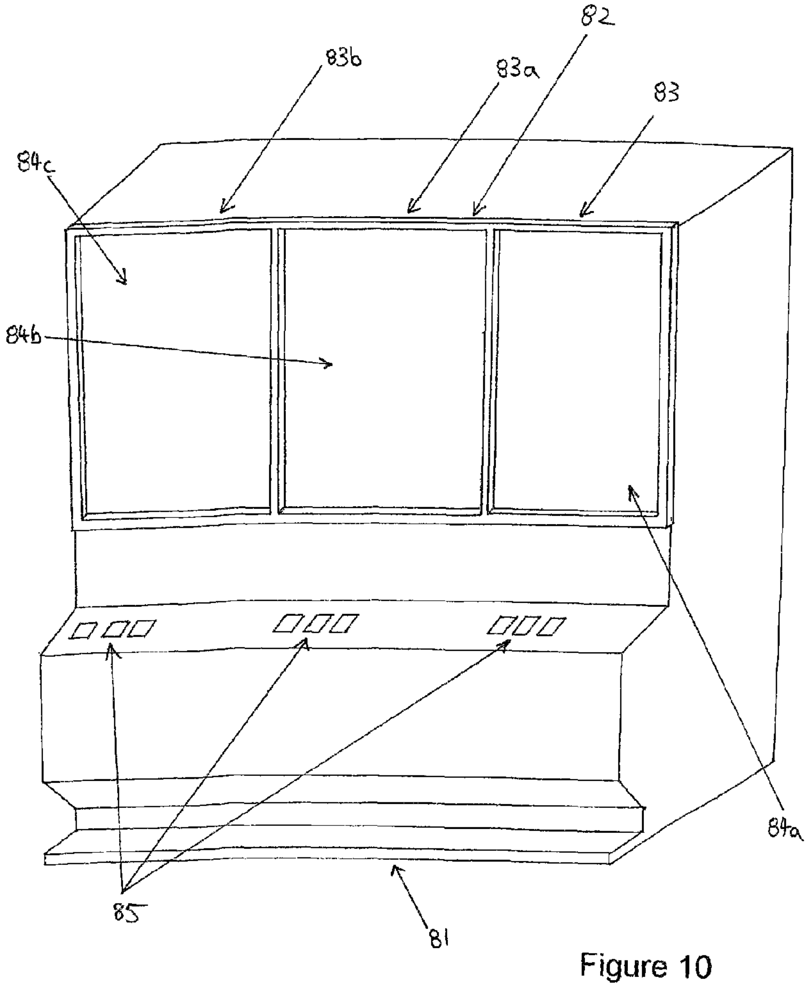
FIG. 10 illustrates a perspective view of a gaming system with a fourth embodiment of a mechanical screen filter.

FIG. 10 shows a fifth embodiment of the present invention comprising a gaming system 81 which is capably of allowing three users to each play a game at a single time. The gaming system has three sets of game buttons 85. The mechanical display filter 82 defines a first aperture 83, a second aperture 83*a* and a third aperture 83*b*. The first aperture 83, the second aperture 83*a* and the third aperture 83*b* define a first, second and third portion of the display screen 84, being 84*a*, 84*b* and 84*c* respectively. The games displayed on each of these portions of the display screen can each be played by a different user. The games may be independent of each other, or may influence or be interconnected with each other. By modifying the game and display software, one or more of the display portions may be selectively varied.

Figure 11:
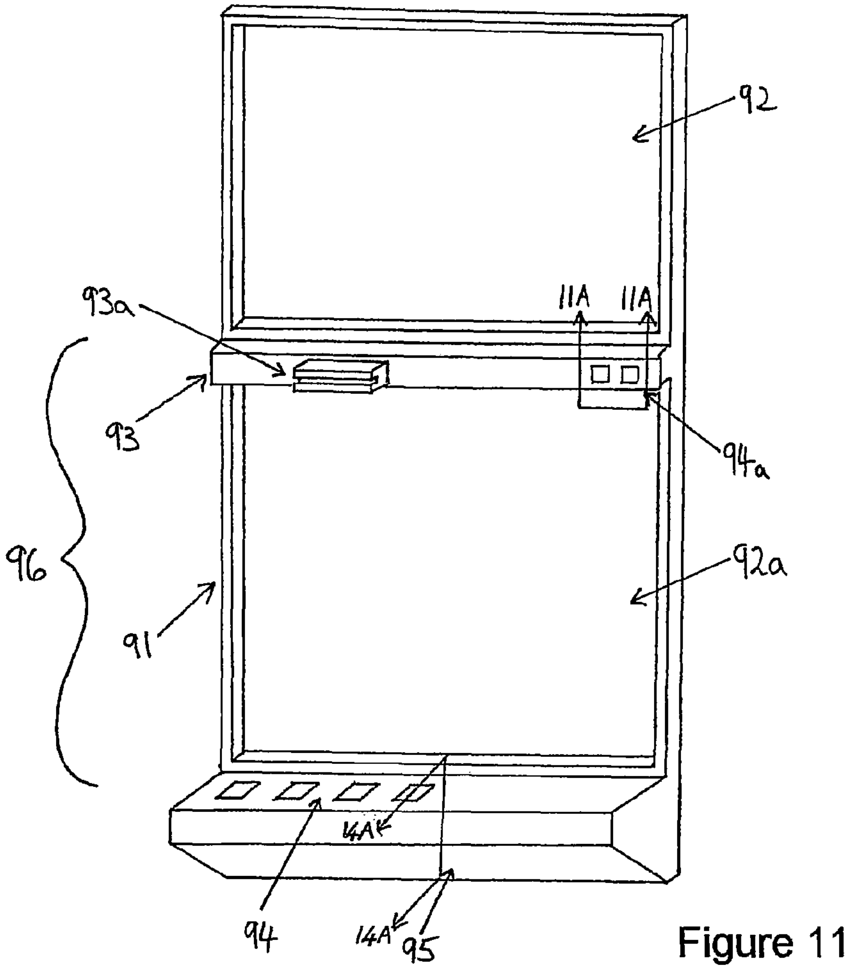
FIG. 11 illustrates a front perspective view of a mechanical screen filter in accordance with a fifth embodiment of the present invention.

Referring to FIG. 11, a sixth embodiment of a mechanical display filter 91 of the present invention is illustrated. The mechanical display filter 91 is in a form of a frame defining a first aperture 92 and a second aperture 92*a*, which is capable of being mounted on a gaming console over a display screen. Between the first aperture 92 and the second aperture 92*a*, the mechanical display filter has a divider 93 carrying a card reader 93*a*. The card reader 93*a* is a magnetic card reader through which a magnetic card can be swiped, causing the card reader to read the information on the card. Similar card readers and cards may be used, such as a smart card. The card reader may alternatively be a slot into which a card is inserted or any other arrangement or type of card reader which is known in the art.

FIG. 11 additionally illustrates a plurality of buttons 94 located on a control panel 95 of the mechanical display filter below the second aperture 92*a* and a plurality of buttons 94*a* located on the divider 93. The buttons may be conventional momentary or similar push buttons which are hardwired to the gaming console. Alternatively, the buttons may consist of an actuator as is described in more detail with respect to FIG. 14.

Figure 12:
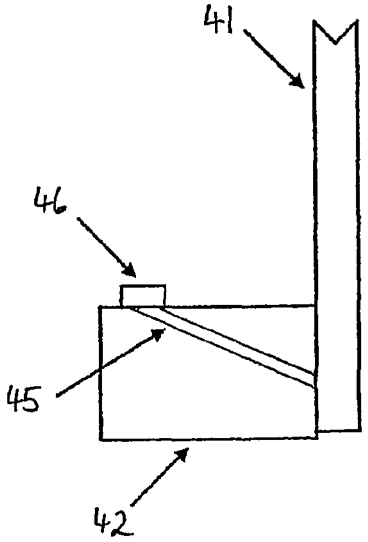
FIG. 12 is a partial cross sectional view of a sixth embodiment of a video display and mechanical display filter.

Referring now to FIG. 12, a video display 41 and mechanical display filter 42 similar to that of FIG. 6, comprises a light tube 45, which carries light from the video display 41 to a button 46. In such embodiments, the button 46 can have a customised display or illumination by having a transparent or translucent face presented to the user. The display visible behind the button 46 appears as part of the button, presenting either graphics or illumination.

The customized display may be game or game category specific with the result that the display screen may generate images and indicia for buttons which images/indicia can then be varied on playing a different game, or in response to variations occurring dynamically in the course of a game.

Figure 13:
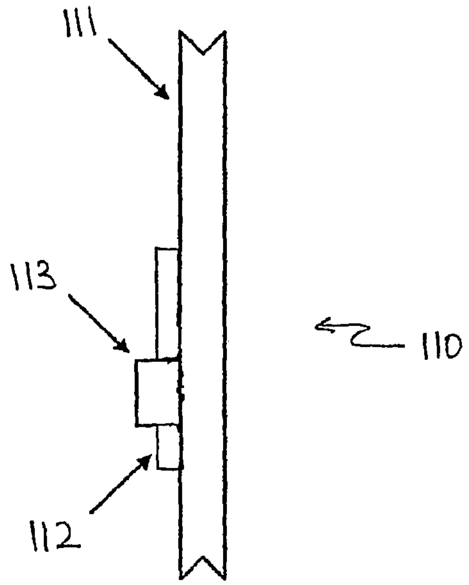
FIG. 13 is a partial cross sectional view of a video display and mechanical screen filter in accordance with a seventh embodiment of the present invention.

FIG. 13 is a partial cross sectional view of a display assembly 110 of a further alternate embodiment of the invention, the display assembly 110 comprising a video display 111 and mechanical display filter 112. In the display assembly 110 of FIG. 8, the video display 111 comprises a touch screen. The mechanical screen filter 112 comprises a button 113 mounted such that user actuation of the button 113 causes actuation of the touch screen 111 at a position of the button 113. The button may be biased in the open position and may be configured, by a stop or otherwise, to limit the amount of force that can be applied to the video display 111 by the by pressing the button 113.

In an alternate embodiment the mechanical display filter and button(s) may be positioned at an edge of the display means, such that only one region of the screen depicts gaming features, while in the second portion of the screen button illumination functionality is provided. This provides the benefits of controllable button illumination, in an otherwise traditional machine. This embodiment may consist of the portion of FIG. 11 indicated by bracket 96.

Figure 14:
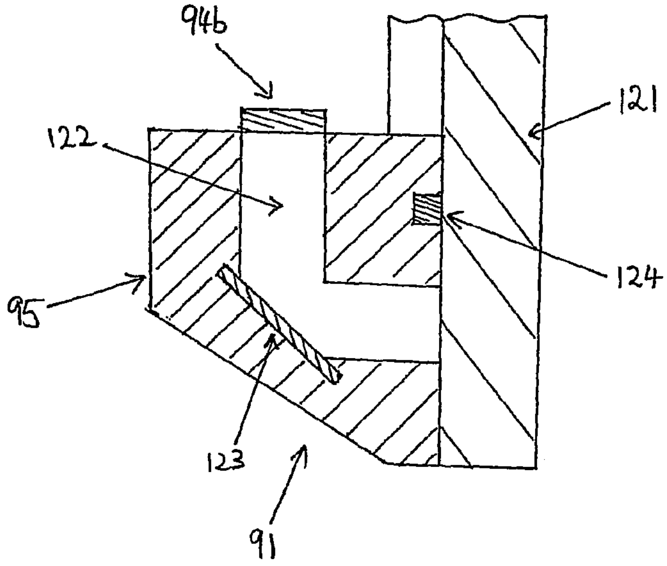
FIG. 14 is a partial section cross sectional view along the lines 14A-14A of FIG. 11.

FIG. 14 is a partial cross sectional view of the control panel 95 of the mechanical display filter 91 of FIG. 11 and one of the plurality of buttons 94 of FIG. 11. The mechanical display is shown mounted over a display screen 121. Light from a portion of the display screen 121 travels through the passage 122, reflecting off the mirror 123. The passage 122 and mirror 123 direct the light from the display screen 121 to the rear of a translucent button 94*b*, thereby illuminating the button. A variety of different images displayed on the display screen 121 causes a variety of different illumination effects in the button 94*b*.

Alternatively, as shown in FIG. 12, the mechanical filter 42 may integrate light pipes 45, to channel the light from the display 41 to a button 46 mounted away from the display 41. This provides further flexibility in the mechanical arrangement of the product. Light pipes may in certain cases provide an advantage of cheaper manufacture or assembly of a product, as it can otherwise be difficult to mount the source of illumination exactly where it is needed.

Figure 11A:
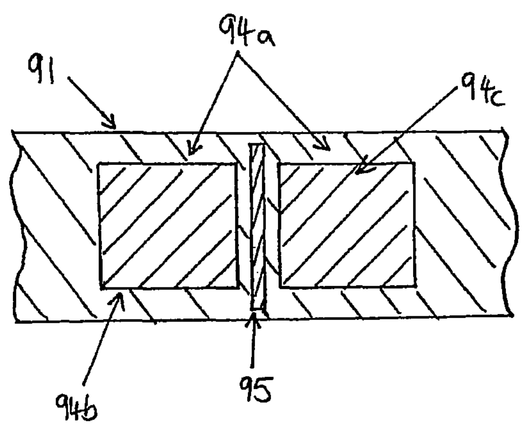
FIG. 11A is a partial cross sectional view along the line 11A-11A of FIG. 11.

In a further embodiment of the present invention, the mechanical filter may incorporate screens to prevent light from one portion of the display screen illuminating a button which is adjacent to another portion of the display screen. This is illustrated in FIG. 11A which shows a partial cross sectional view of the middle portion of the mechanical screen filter 91 containing two transparent buttons 94*a*, being 94*b* and 94*c*. The buttons 94*a* are mounted over a display screen which is capable of illuminating the buttons 94*a*. The screen 95 prevents light from a portion of a display screen behind button 94*b* from illuminating button 94*c*, and visa versa. In a further embodiment, additional screens may be provided to surround each button.

The mechanical filter 42 is attached to the console in such a way that it is easily replaced, so as to facilitate easy initial manufacturing, and so as to allow field upgrades of products. For example the number of player buttons on a gaming machine may vary according to the game. It is advantageous to be easily able to change the button panel carried by the mechanical display filter 42 to change the number of buttons. The button panel may incorporate electronic identification allowing the game machine to verify that the button panel is correct for the game being played. Further the regions on the filter corresponding to areas to be illuminated as seen by the layer may be different depending on the filter, even where the filter has the same button functionality. Identification of the mechanical filter type allows the correct regions of the filter to be illuminated.

One or more optical sensors on the filter may be used to more precisely align the illumination regions on the display with the corresponding areas on the filter. Mechanical misalignment between the filter and display may cause light from one region to illuminate a region of the filter adjacent to the intended region of illumination. The display is illuminated in a scanning pattern to determine the pixel(s) corresponding to the optical sensor(s), and the resulting data used to determine the degree of misalignment and dynamically determine the correct regions of the screen to illuminate.

Additionally shown in FIG. 14 is an optical sensor 124 located on the face of the mechanical display filter 91 which is adjacent to the display screen 121. The optical sensor 124 detects whether the portion of the display screen 121 adjacent to it is illuminated.

A single touch screen covering the entire display may be used instead of a plurality of separate touch screens for each display. With some touch screen technology it is possible to replace the human finger with other implements, and in this case the touch screen can be used to sense button presses by the player. As all electronic button sensing is performed by the touch screen the new button becomes a simple mechanical device, eliminating the wiring present in a traditional button panel.

Traditionally the alignment between the touch screen and display must be determined so that mechanical misalignment can be calibrated out. This process is simplified, as the location of the optical sensor 124 with respect to the buttons is fixed, and the location of the optical sensor 124 with respect to the display can be determined as previously described. Hence the location of the touch screen with respect to the display is easily determined when the user presses a button. This calibration may be done either in a special calibration mode, or dynamically as the gaming machine is used.

In a further embodiment of the present invention, the mechanical display filter may include identification means, such as a filter identifier, which enables a game controller, such as the controller 21, or a separate controller, which may be in data communication with the controller 21, to identify the mechanical display filter mounted over a display screen. For example, the identification means may be electronic and may comprise a memory card installed in the mechanical display filter. The memory card has wires or terminals which conductively connect to a plug or corresponding terminals on a game console. The game controller is incorporated in the game console and is able to electronically communicate with the memory card through the wires and plug or terminals. In another example, the filter identifier may consist of a RFID transponder which communicates with the gaming controller. A filter identifier 77 is shown embedded in FIG. 9A.

The game controller is able to identify the mechanical display filter from the communications received from the filter identifier 77. The information received from the filter identifier 77 allows the game controller to determine whether the mechanical display filter comprises a correct number of buttons for play of the game or games to be displayed on the display screen and to appropriately configure the at least two portions of the display screen to physically align with at least one portion of the image displayed on the display screen. Other methods for storing and transmitting information electronically may be employed.

Figure 15:
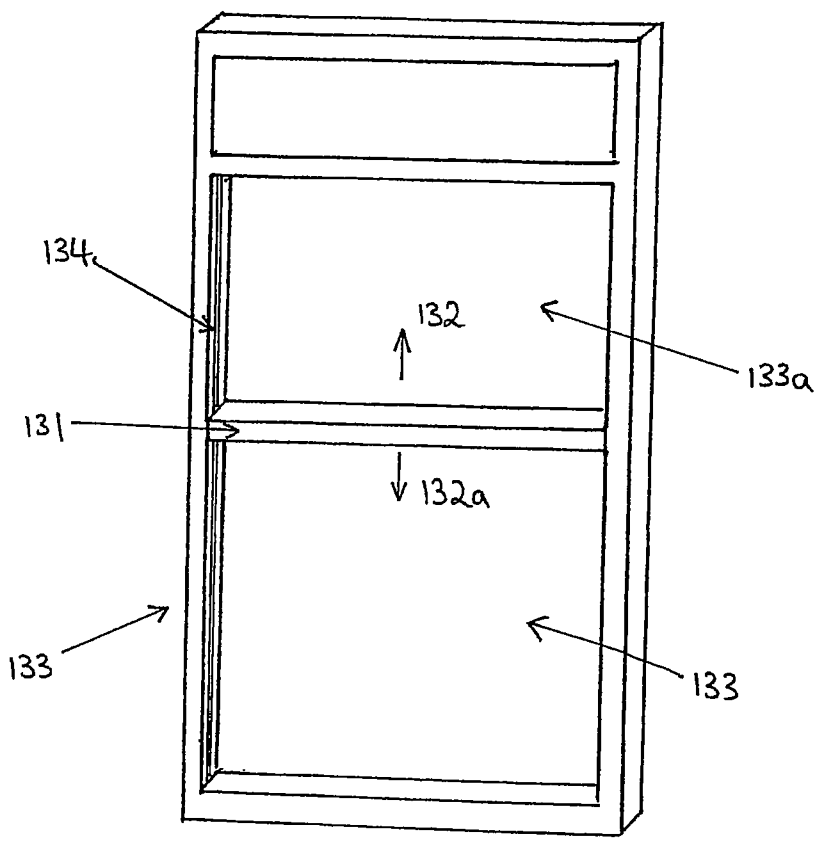
FIG. 15 illustrates a front perspective view of an eighth embodiment of a mechanical screen filter of the present invention.

FIG. 15 illustrates a mechanical display filter 133 comprising a movable divider 131, so that its position with respect to a display can be adjusted. A simple vertical adjustment as indicated by arrows 132 and 132*a* allows the proportion of the display lower than the filter 133 to be adjusted relative to the proportion above the filter 133*a*. This allows the portions of the display allocated to different purposes to be adjusted. The movable divider 131 may slide up and down a track 134 in the mechanical display filter 133.

As described previously the gaming machine can sense the position of the filter on the display.

This adjustment may be performed when the machine is being manufactured, allowing manufacturing to easily produce different product configurations. Alternately the adjustment may be performed in the field, to customise the console to a particular game or gaming venue operator's preference.

Alternately the adjustment may be performed by the player and cause the presentation of the game to change. Graphics may automatically scale or be otherwise adjusted to appropriately fit the display. The gaming machine may have a set of game presentations from which the one displayed is selected according to the filter position.

Alternately the game mathematics may change according to the position of the filter. The gaming machine may have a set of game mathematics from which one is selected according to the filter position. For example the game may be a spinning reels type slot machine, with 5 reels each 3 symbols high. When the filter is moved up (or down, depending on the game design), the screen available for the reels grows larger, and the number of symbols on each reel expands from 3 to 4. The game mathematics changes appropriately, to compensate for the new number of symbols, for example by changing the layout of symbols on the reel strips. Alternately the filter position is used as part of the calculation the game mathematics.

Appropriate cooling methods are preferably applied to compensate for retention of heat by the mechanical display filter.

Figure 16:
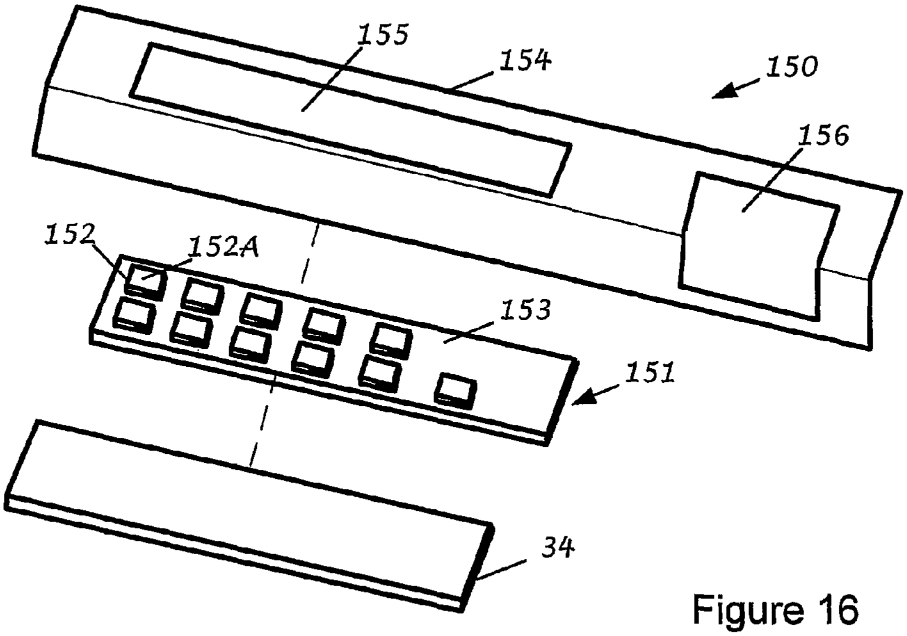
FIG. 16 shows diagrammatically an exploded view of a keyboard user interface in accordance with an embodiment of the present invention.
Figure 17:
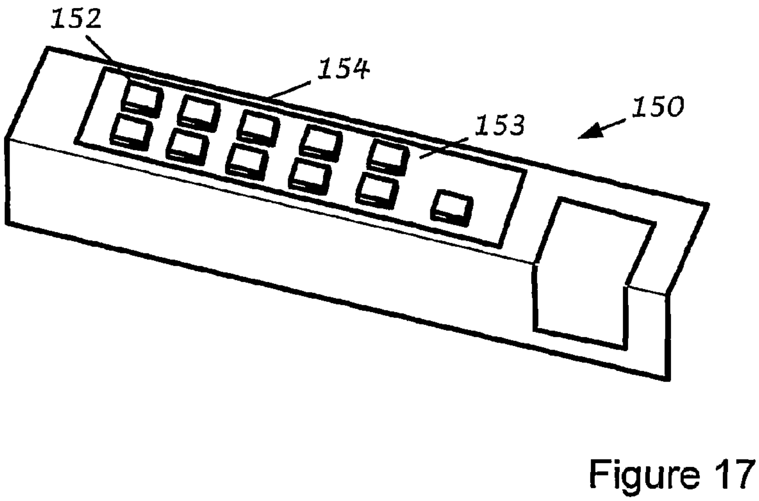
FIG. 17 shows diagrammatically a top view of a keyboard user interface in accordance with an embodiment of the present invention.

FIG. 16 shows diagrammatically an exploded view of a user interface 150 in accordance with an embodiment of the present invention and FIG. 17 shows an assembled view of the user interface 150. The user interface 150 replaces the bank of buttons 16 on the slot machine 10 (see FIG. 1) and forms the keyboard interface 33 of the gaming device 100 (see FIG. 2), or at least a part thereof. The user interface 150 includes a bank of buttons 151, including individual buttons 152 (one only indicated in FIGS. 5 and 6) which may include the button 14 (see FIG. 1) and which are movable up and down relative to a button housing 153. The number of buttons 152 in the bank of buttons 151 is selected according to the requirements for the particular gaming device 100. While FIG. 16 shows a single integral button housing 153, the button housing 153 for the bank of buttons 151 may include multiple parts. The user interface 150 may be retrofitted on to existing slot machines.

At least one of the buttons 152 is made from materials so that at least the top 152A of the button 152 is transparent or translucent. In one embodiment all of the buttons 152 are made from transparent or translucent material. The sides of the button 152 may also be transparent or translucent, or may be opaque. The buttons 152 may not have a base extending across the button 152 parallel to the top 152A, but if a base is provided it is also made from a transparent or translucent material. Alternatively, the buttons 152 could include an aperture through which the button display 34 may be viewed, although this may be less preferred due to creating potential problems with cleaning as well as other potential problems.

The button housing 153 supports and guides the buttons 152 as they are pressed and released. The button housing 153 may contain a circuit including a column-row matrix of conductors so that the buttons 152 act as switches that connect a column and row when pressed. This arrangement of wiring for the buttons 152 is like a conventional keyboard for a personal computer. The matrix may then be monitored by the controller 21 for button presses in the usual manner for a conventional keyboard. While other methods of detecting presses of the buttons 152 may be used, methods that result in a low profile may be preferred. The conductors are preferably routed around the line of sight through the top of the buttons 152 so as not to obstruct view of the display 34 (see herein below).

The user interface 150 may include a cover 154 that sits over the button housing 153. The cover 154 may include an aperture 155 through which the buttons 152 may protrude when the user interface 150 is assembled. A second aperture 156 may be provided for a bill acceptor, card reader, coin input mechanism or other device. The cover 154 may be secured to the gaming console 10 through any suitable method. Those skilled in the relevant arts will appreciate that the shape and dimensions of the cover will vary to suit particular gaming consoles.

The user interface 150 further includes a button display 34. While in the embodiments described previously herein the display for the buttons is the main display on which game images are shown, the display 34 is separate from the game display. The keyboard display is suitably a LCD panel of approximately equal dimensions to the area occupied by the buttons 152 and is located behind the buttons 152 (in the example of an upwardly facing bank of buttons this is below the buttons 152), so as to be viewable through the transparent or translucent buttons 152. As explained herein above, the button display 34 may be controlled by the controller 21. Optionally, the button display 34 may instead or in addition be controlled or controllable by a remote device. The remote device may communicate with the keyboard display through the network card 38 and optionally the computational device 20 and I/O interface 32 if direct communication between the button display 34 and network card 38 is not provided. Alternatively, the button display 34 may communicate with a remote device using another network interface or via a direct communication channel.

The button display 34 may be operated in a similar manner to a display for a touch screen interface, displaying material that represent buttons that may be pressed by a player of the gaming device 100. If the buttons 152 are transparent, then the material could be clearly viewed through the buttons 152 and the material displayed may be icons, letters, numbers, pictures or any other material. The material may inform a player of the function that the gaming device 100 will perform when the button 152 is pressed, at least when the player is required to provide an input using one of the buttons 152. The button display 34 may differentiate between buttons that are "active" (i.e. if pressed will result in an action being completed by the gaming device 100) and those that are "inactive". For example, the button display 34 may display below active buttons icons, letters or numbers indicative of the action that will be completed if the button is pressed, while other buttons that will not result in any action at that time may display pictures, colors or be blank.

Providing a single button display 34 for a single bank of buttons may be preferred for cost reasons. However, two or more keyboard displays 34 may be provided if required for a particular implementation.

If the buttons are translucent so that detailed information can not be viewed through the buttons, the buttons could be color coded to indicate their function, although it is expected that this embodiment may not be well suited for use with a gaming device 100.

In one embodiment, the user interface includes one or more optical elements that may be arranged to increase the visibility of the material displayed on the button display 34 through the buttons 152, or to otherwise modify the appearance of the material. The optical elements may be provided as part of the buttons 152, for example part of the top 152A, located within the buttons 152 and/or located between the buttons 152 and button display 34. The optical elements may, for example, magnify the image of the icon as it is seen through the button 152. Also, a light pipe or other light channel may span the distance between the button display 34 and the buttons 152.

The button housing 153 may be opaque and therefore act as a mask over the button display 34. Alternatively, the button housing 153 or portions of the button housing 153 may be translucent or transparent, or may include one or more apertures. These options allow the button display 34 to be at least partly viewed through the button housing 153. This may allow the background area to the buttons to be varied, for example according to the particular game that is being played or status of the game that is being played.

In another embodiment, material identifying the function that the buttons 152 perform may be viewed through the button housing 153 in addition to, or instead of through the buttons 152. In this embodiment the buttons 152 may be opaque or translucent and the cover 154 may be transparent.

Figure 18:
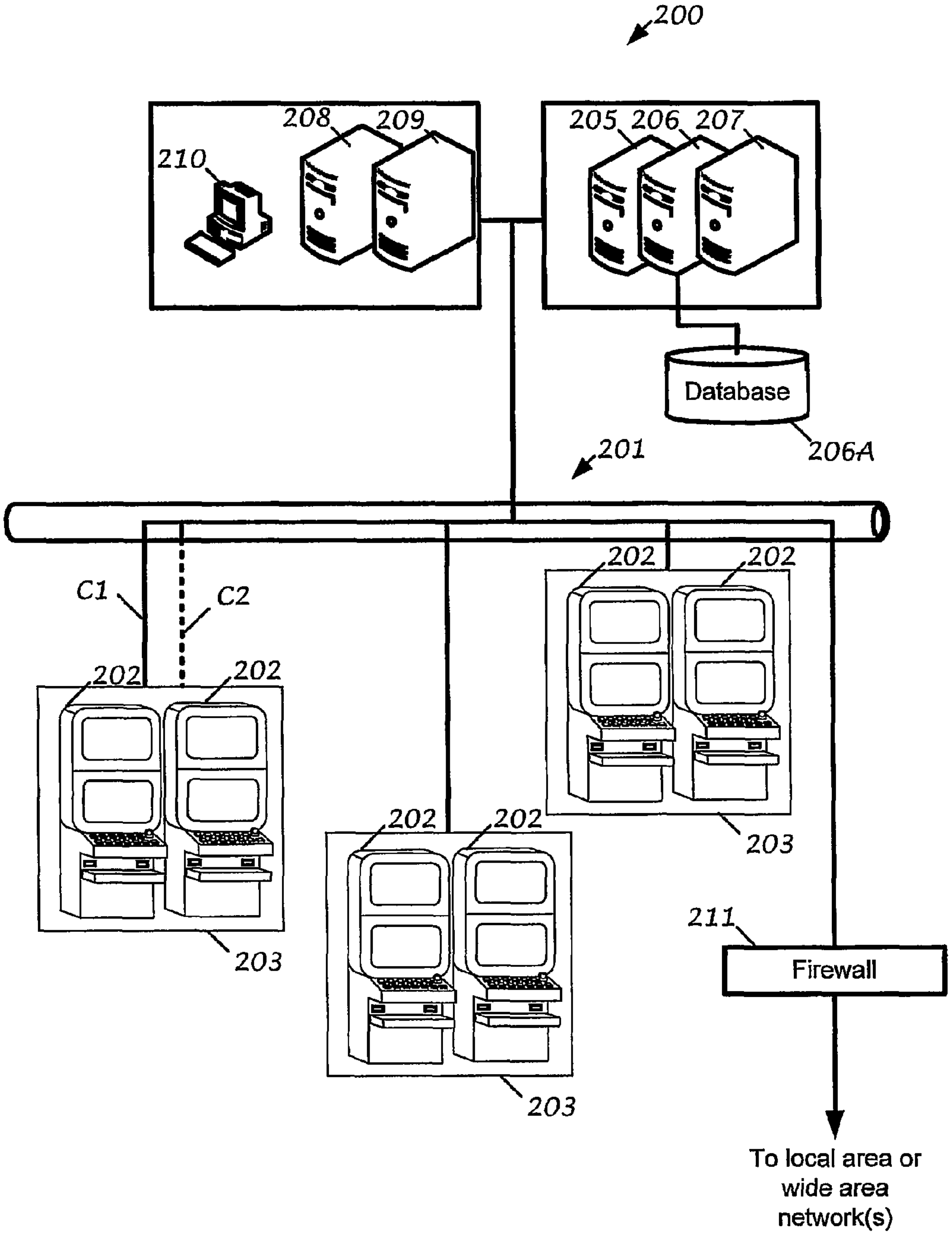
FIG. 18 shows a view of a gaming network suitable for implementing an embodiment of the present invention.

FIG. 18 shows a gaming system 200. The gaming system 200 includes a network 201, which for example may be an Ethernet network. Gaming devices 202, shown arranged in three banks 203 of two gaming devices 202 in FIG. 18, are connected to the network 201. The gaming devices 202 may form part or all of a gaming device 100. Single gaming devices 202 and banks 203 containing three or more gaming devices 202 may also be connected to the network 201.

Each gaming device 202 or each bank 203 may have a single connection point to the network 201. However, in alternative embodiments, a gaming device 202 may have two or more connections to the network 201, for example connections C1 and C2 shown in FIG. 18. In one embodiment, the network card 78 may use connection C1 and the button display 34 may have its own interface to the network and communicate with the network 201 through connection C2.

Servers may also be connected to the network 201. For example, a game server 205 may generate game outcomes for games played on the gaming devices 202, a database management server 206 may manage the storage of game programs and associated data for downloading or access by the gaming devices 202 in a database 206A, and a jackpot server 207 may control one or more jackpots associated with the gaming devices 202.

Further servers may be provided to assist in the administration of the gaming system 200, including for example a gaming floor management server 208, and a licensing server 209 to monitor the use of licenses to particular games. An administrator terminal 210 is provided to allow an administrator to run the network 201 and the devices connected to the network.

The gaming system 200 may communicate with other gaming systems, other local networks, for example a corporate network and/or a wide area network such as the Internet through a firewall 211.

Some or all of the gaming devices 202 may be able to download games from the database management server 206. In this embodiment, the games may include or be downloaded together with instructions to control the button display 34, in which case the game controller 21 may control both the display screen 11 and button display 14. Alternatively, the button display may communicate directly with the network card 38 or communicate with the network using its own communication interface and connection C2 to receive commands as to what to display from the database management server 206 or another device connected to the network 201.

Instructions to control the button display 34 may also be provided in a similar manner to gaming devices 202 that play a plurality of games, which are stored locally to the gaming device 202. In this embodiment, the gaming device 202 communicates (or is interrogated) as to what game it is playing and then the appropriate control instructions are communicated to the button display 34. The button display 34 may have its own controller, for example a microprocessor based controller, which may be able to be programmed in the field, for example by downloading instructions from the database management server 206. In a multi-game gaming device 202, the games may include program code to control the button display 34.

The button display 34 may receive and continually display material in response to a single communication from the game controller 21, network card 38 or network 201 to avoid having to maintain a constant communication link with the button display 34.

The button display 34 may therefore display a wide range of indicia for each button 152, increasing the flexibility in the display and which may allow the gaming device 100 to be designed to be more attractive to players. For example, where multiple games are playable on the gaming apparatus, the button display 34 may display different indicia for the buttons for different games. Where the games are controlled centrally, the button display 34 may also be controlled centrally. The indicia for the buttons may change depending on game events. For example, if a bonus game is triggered during game play the buttons may change or may be displayed differently to emphasise the different play conditions.

Certain players may have preferences for display, for example preferences for particular display fonts, colors, or styles, which could be stored in the gaming device 100 or remote from the gaming device 100 and communicated to the gaming device 100 after a player has identified themselves as playing the gaming device 100. The buttons may be used to indicate to a player when they have wagered a certain amount or when their game play of the gaming device 100 reaches a predefined threshold level.

In addition, when the gaming device 100 is not being played, the button display 34 may use the buttons 152 as part of attract sequences, for example by cycling through sequences of illumination of the buttons 152 and/or displaying the buttons in various colors. The button display 34 may be used to indicate other events, preferences or other information, depending on the device that the user interface 150 is applied to.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A user interface apparatus for a gaming machine configured to play a game, and for use with a computational controller, the user interface apparatus comprising:
- a communication interface for connection to the computational controller;
- a bank of buttons comprising a plurality of buttons and a button housing;
- circuitry connected to the communication interface and configured to detect a pressing of a button in the bank of buttons; and
- a unitary display screen connected to the communication interface and configured to be controlled by control signals received at the communication interface and to display a plurality of game images, wherein said bank of buttons are removably mounted in front of the unitary display screen, thus at least a portion of said plurality of game images on said unitary display screen illuminating at least a portion of said bank of buttons, and wherein the at least a portion of said plurality of game images are viewable through at least one of: 1) two of said plurality of buttons and 2) the button housing, the unitary display screen being configured to differentiate between active and inactive buttons, wherein active buttons when pressed result in an action being completed by the gaming machine, and wherein inactive buttons are configured to display at least one of: 1) a background picture, 2) a designated colour and 3) a blank; and wherein said active buttons are configured to display information to a player indicative of at least one of: 1) when the player has wagered a certain amount and 2) when game play of the gaming machine reaches a predefined threshold level.

2. The user interface apparatus of claim 1, wherein the communication interface comprises a first connection and a second connection, the first connection communicating information indicative of the pressing of a button in the bank of buttons and the second connection communicating control information to the unitary display screen.

3. The user interface apparatus of claim 1, wherein the bank of buttons comprises at least a portion that is constructed from a transparent or translucent material through which the unitary display screen is viewable.

4. The user interface apparatus of claim 1, wherein at least one said button is transparent and the button housing is translucent or opaque.

5. The user interface apparatus of claim 1, wherein at least one said button comprises a translucent or transparent top surface and opaque or substantially opaque side walls extending from the top surface.

6. The user interface apparatus of claim 1, wherein the unitary display screen extends below every one of the buttons in the bank of buttons.

7. The user interface apparatus of claim 1, wherein the circuitry comprises a column-row matrix of conductors and the buttons are switches that connect a column and row in the matrix when depressed.

8. The user interface apparatus of claim 1, wherein the circuitry comprises a touch screen provided over the unitary display screen arranged to detect the pressing of any of the plurality of buttons.

9. The user interface apparatus of claim 7, wherein the buttons are transparent to allow the unitary display screen to viewed there through.

10. The user interface apparatus of claim 9, wherein the circuitry is arranged about the buttons so as to not impede viewing of the unitary display screen through the buttons.

11. The user interface apparatus of claim 1, further comprising at least one optical component to modify the image displayed on the unitary display screen as viewed through the button or button housing.

12. An apparatus for performing computational tasks for a gaming machine configured to play a game, in response to inputs received from a user interface, the apparatus comprising:

a unitary display screen configured to display a plurality of game image, and a bank of buttons removably mounted in front of the unitary display screen, and communicably connected to an electronic processing system, the electronic processing system being in communication with memory storing program code and operable to execute the program code, wherein the unitary display screen is controlled by the electronic processing system and at least a portion of said plurality of game images are viewable through the bank of buttons at a plurality of separate locations, the unitary display screen being configured to differentiate between active and inactive buttons, wherein active buttons when pressed result in an action being completed by the gaming machine, and wherein inactive buttons are configured to display at least one of: 1) a background picture, 2) a designated colour and 3) a blank; and wherein said active buttons are configured to display information to a player indicative of at least one of: 1) when the player has wagered a certain amount and 2) when game play of the gaming machine reaches a predefined threshold level.

13. The apparatus of claim 12, wherein the unitary display screen is controlled by the electronic processing system to display information indicating a function of at least two buttons in the bank of buttons.

14. The apparatus of claim 12, wherein the unitary display screen extends substantially across the area occupied by at least two buttons in the bank of buttons and is controlled by the electronic processing system to display information indicating a function of each said button.

15. The apparatus of claim 12, wherein the bank of bank of buttons comprises a button and a button housing and wherein the unitary display screen is viewable through at least one button and the button housing is one of translucent and opaque.

16. The apparatus of claim 15, wherein the bank of buttons comprises a plurality of buttons and a button housing, the unitary display screen being viewable through each of the plurality of buttons.

17. The apparatus of claim 12, wherein the program code comprises a plurality of separate programs, each program when executed by the electronic processing system causing the electronic processing system to control the unitary display screen to display different material that is viewable through the bank of buttons.

18. The apparatus of claim 12, wherein the program code comprises at least one program that has at least two states in which different material is displayed on the unitary display screen.

19. An apparatus for performing computational tasks for a gaming machine configured to play a game, in response to inputs received from a user interface, the apparatus comprising:

a computational controller, a user interface comprising a bank of buttons and circuitry arranged so that the computational controller detects the pressing of a button in the bank of buttons, a unitary display screen with said bank of buttons removably mounted thereon, and controlled by the computational controller, the computational controller operating in at least two modes of operation to control the unitary display screen to display material indicating the function of at least one button and a plurality of game images through the bank of buttons, the material differing for each said mode of operation, the bank of buttons being constructed so that the material and at least a portion of said plurality of game images displayed by the unitary display screen are viewable there through, and the unitary display screen being configured to differentiate between active and inactive buttons, wherein active buttons when pressed result in an action being completed by the gaming machine, and wherein inactive buttons are configured to display at least one of: 1) a background picture, 2) a designated colour and 3) a blank; and wherein said active buttons are configured to display information to a player indicative of at least one of: 1) when the player has wagered a certain amount and 2) when game play of the gaming machine reaches a predefined threshold level.

20. The apparatus claim 19, wherein the modes of operation comprise two different states of the computational device during execution of program code.

21. The apparatus of claim 19, wherein the modes of operation comprise execution of two different programs.

* * * * *